(12) United States Patent
Mishra et al.

(10) Patent No.: US 10,057,209 B2
(45) Date of Patent: Aug. 21, 2018

(54) TIME-SEQUENCED MULTI-DEVICE ADDRESS ASSIGNMENT

(71) Applicant: QUALCOMM Incorporated, San Diego, CA (US)

(72) Inventors: Lalan Jee Mishra, San Diego, CA (US); Radu Pitigoi-Aron, San Jose, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 15/221,973

(22) Filed: Jul. 28, 2016

(65) Prior Publication Data
US 2018/0034767 A1 Feb. 1, 2018

(51) Int. Cl.
| | |
|---|---|
| *H04L 29/12* | (2006.01) |
| *H04L 12/40* | (2006.01) |
| *H04W 52/02* | (2009.01) |
| *H04W 72/12* | (2009.01) |
| *G06F 13/37* | (2006.01) |

(52) U.S. Cl.
CPC ......... *H04L 61/2061* (2013.01); *G06F 13/37* (2013.01); *H04L 12/40013* (2013.01); *H04W 52/0235* (2013.01); *H04W 72/1263* (2013.01)

(58) Field of Classification Search
CPC .............. H04J 3/1605; H04L 61/2061; H04L 12/40013; H04W 52/0235; H04W 72/1263
See application file for complete search history.

(56) References Cited

U.S. PATENT DOCUMENTS

| | | | |
|---|---|---|---|
| 5,404,460 A | 4/1995 | Thomsen et al. | |
| 6,629,172 B1 | 9/2003 | Andersson et al. | |
| 6,745,270 B1* | 6/2004 | Barenys | G06F 13/4291 710/104 |
| 6,918,057 B1* | 7/2005 | Brophy | G01R 31/31853 714/30 |
| 8,205,017 B2 | 6/2012 | Parr et al. | |

(Continued)

OTHER PUBLICATIONS

International Search Report and Written Opinion for PCT/US2017/043488, dated Nov. 9, 2017, 12 pages.

*Primary Examiner* — Phong La
(74) *Attorney, Agent, or Firm* — Withrow & Terranova, PLLC

(57) ABSTRACT

Time-sequenced multi-device address assignment is provided. In this regard, an electronic device includes a plurality of client devices that are daisy-chained to a host interface port in a host controller by a reset line. The host controller is configured to assert the reset line to reset the daisy-chained client devices and then sequentially de-assert the reset line for the daisy-chained client devices according to a determined time sequence. Accordingly, the host controller assigns a unique client device address to each of the client devices when the reset line is de-asserted for the client device. By daisy-chaining the client devices via the reset line and sequentially assigning the unique client device addresses based on the determined time sequence, it is possible to assign the unique client device addresses from a single host interface port, thus reducing design complexity, footprint, and power consumption in the electronic device.

16 Claims, 7 Drawing Sheets

(56) References Cited

U.S. PATENT DOCUMENTS

| | | | |
|---|---|---|---|
| 8,516,176 B1* | 8/2013 | Sleator | G06F 13/00 710/110 |
| 8,731,002 B2 | 5/2014 | Pan et al. | |
| 2003/0128702 A1* | 7/2003 | Satoh | G06F 13/37 370/390 |
| 2007/0165457 A1* | 7/2007 | Kim | G06F 13/1684 365/185.11 |
| 2008/0040515 A1 | 2/2008 | Schaetzle | |
| 2008/0205168 A1* | 8/2008 | Pyeon | G06F 13/4247 365/189.14 |
| 2009/0006915 A1* | 1/2009 | Gomez | G01R 31/31853 714/727 |
| 2010/0280786 A1* | 11/2010 | Gorbold | G06F 12/0661 702/120 |
| 2011/0119405 A1* | 5/2011 | Parr | G06F 13/37 710/4 |
| 2012/0221755 A1* | 8/2012 | Schultz | G05B 19/4185 710/110 |
| 2012/0233433 A1 | 9/2012 | Grunzke | |
| 2012/0243559 A1* | 9/2012 | Pan | H04J 3/1605 370/503 |
| 2012/0303836 A1* | 11/2012 | Ngo | G06F 13/4247 710/10 |
| 2014/0122756 A1 | 5/2014 | Laskar | |
| 2014/0198744 A1* | 7/2014 | Wang | H04B 7/0617 370/329 |
| 2014/0337552 A1* | 11/2014 | Evans | G06F 13/4291 710/110 |
| 2015/0145563 A1 | 5/2015 | Pardoen | |
| 2015/0223178 A1* | 8/2015 | Pietraski | H04L 5/001 370/252 |
| 2016/0170930 A1* | 6/2016 | Weng | G06F 13/4282 710/110 |
| 2016/0269095 A1* | 9/2016 | Hirata | G06F 13/4247 |

\* cited by examiner

TIME-SEQUENCED MULTI-DEVICE ADDRESS ASSIGNMENT

BACKGROUND

I. Field of the Disclosure

The technology of the disclosure relates generally to communicating with multiple client devices over a shared bus.

II. Background

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

Increasingly complex integrated circuits (ICs) have been designed and manufactured to provide greater functionality in mobile communication devices. One such complex IC is a host controller for concurrently controlling multiple peripheral devices (e.g., cameras, speakers, etc.) over a shared bus. In this regard, it is necessary to identify each of the multiple peripheral devices by a unique device address. The unique device addresses can be assigned to the multiple peripheral devices in a variety of address assignment methods. For example, the unique device addresses can be pre-assigned when the peripheral devices are manufactured. Alternatively, the unique device addresses can be dynamically assigned using such techniques as dedicated physical pins, eFuse addressing, or random number-based addressing.

However, the above-mentioned address assignment methods have obvious deficiencies. On one hand, pre-assignment of the unique device addresses can make address maintenance a difficult task and limit interoperability of the peripheral devices. On the other hand, dynamic device assignment methods require that additional physical pins, or an eFuse block, or a random number block be added to the mobile communication devices, thus increasing design complexity, footprint, and power consumption. Hence, it is desirable to overcome the deficiencies of the above-mentioned address assignment methods.

SUMMARY OF THE DISCLOSURE

Aspects disclosed in the detailed description include time-sequenced multi-device address assignment. In this regard, an electronic device includes a plurality of client devices that are daisy-chained to a host interface port in a host controller by a reset line. The host controller is configured to assert the reset line to reset the daisy-chained client devices and then de-assert sequentially the reset line for the daisy-chained client devices according to a determined time sequence. The host controller assigns a unique client device address to each of the client devices when the reset line is de-asserted for the client device. By daisy-chaining the client devices via the reset line and sequentially assigning the unique client device addresses based on the determined time sequence, it is possible to assign the unique client device addresses from a single host interface port, thus reducing design complexity, footprint, and power consumption in the electronic device.

In this regard, in one aspect, an electronic device is provided. The electronic device includes a host controller including a host interface port. The electronic device also includes a plurality of client devices communicatively coupled to the host interface port via a shared bus. The electronic device also includes a reset line configured to daisy-chain the plurality of client devices to the host interface port. A first daisy-chained client device among the plurality of daisy-chained client devices is disposed closest to the host interface port. A last daisy-chained client device among the plurality of daisy-chained client devices is disposed farthest from the host interface port. The host controller is configured to assert the reset line to reset the plurality of daisy-chained client devices. The host controller is also configured to de-assert the reset line for the plurality of daisy-chained client devices sequentially from the first daisy-chained client device to the last daisy-chained client device according to a determined time sequence. The host controller is also configured to assign a plurality of unique client device addresses to the plurality of daisy-chained client devices when the reset line is de-asserted for the plurality of daisy-chained client devices, respectively.

In another aspect, an electronic device is provided. The electronic device includes a means for controlling a host including a host interface port. The electronic device also includes a plurality of client devices communicatively coupled to the host interface port via a shared bus. The electronic device also includes a means for resetting client devices configured to daisy-chain the plurality of client devices to the host interface port. A first daisy-chained client device among the plurality of daisy-chained client devices is disposed closest to the host interface port. A last daisy-chained client device among the plurality of daisy-chained client devices is disposed farthest from the host interface port. The means for controlling the host is configured to assert the means for resetting client devices to reset the plurality of daisy-chained client devices. The means for controlling the host is also configured to de-assert the means for resetting client devices for the plurality of daisy-chained client devices sequentially from the first daisy-chained client device to the last daisy-chained client device according to a determined time sequence. The means for controlling the host is also configured to assign a plurality of unique client device addresses to the plurality of daisy-chained client devices when the means for resetting client devices is de-asserted for the plurality of daisy-chained client devices, respectively.

In another aspect, a method for assigning a plurality of unique client device addresses to a plurality of client devices is provided. The method includes daisy-chaining the plurality of client devices to a host interface port via a reset line. The method also includes asserting the reset line to reset the plurality of daisy-chained client devices. The method also includes de-asserting the reset line for the plurality of daisy-chained client devices sequentially from a first daisy-chained client device to a last daisy-chained client device according to a determined time sequence. The method also includes assigning the plurality of unique client device addresses to the plurality of daisy-chained client devices when the reset line is de-asserted for the plurality of daisy-chained client devices, respectively.

In another aspect, a host controller is provided. The host controller includes a host interface port. The host controller also includes a reset line configured to daisy-chain a plurality of client devices to the host interface port. A first daisy-chained client device among the plurality of daisy-chained client devices is disposed closest to the host interface port. A last daisy-chained client device among the plurality of daisy-chained client devices is disposed farthest from the host interface port. The host controller is configured to assert the reset line to reset the plurality of daisy-chained client devices. The host controller is also configured to de-assert the reset line for the plurality of daisy-chained client devices sequentially from the first daisy-chained client device to the last daisy-chained client device according to a determined time sequence. The host controller is also configured to assign a plurality of unique client device addresses to the plurality of daisy-chained client devices when the reset line is de-asserted for the plurality of daisy-chained client devices, respectively.

DETAILED DESCRIPTION

Figure 1:
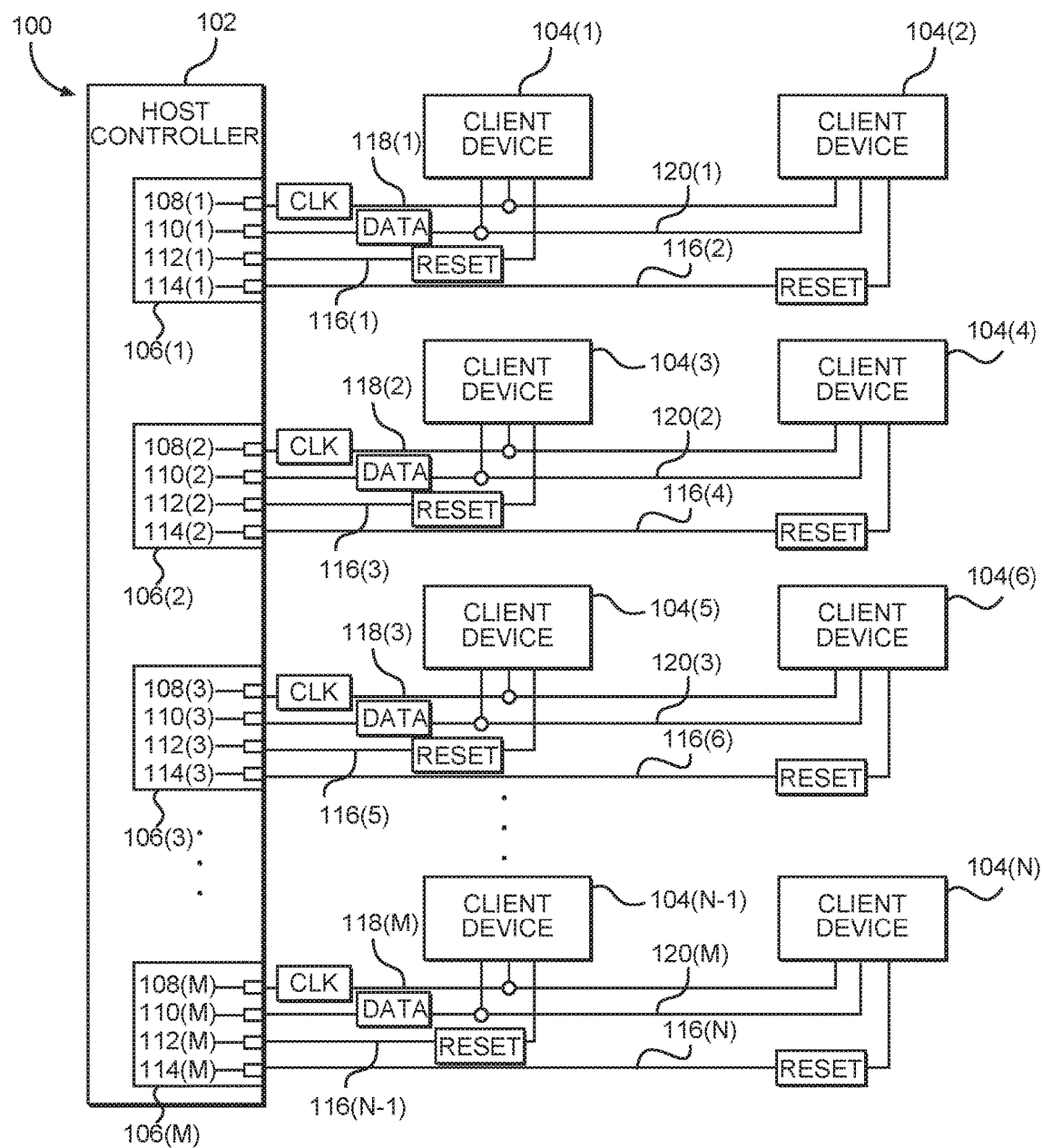
FIG. 1 is a conventional electronic device including a conventional host controller configured to assign unique client device addresses to a plurality of client devices from a plurality of host interface ports.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include time-sequenced multi-device address assignment. In this regard, an electronic device includes a plurality of client devices that are daisy-chained to a host interface port in a host controller by a reset line. The host controller is configured to assert the reset line to reset the daisy-chained client devices and then de-assert sequentially the reset line for the daisy-chained client devices according to a determined time sequence. The host controller assigns a unique client device address to each of the client devices when the reset line is de-asserted for the client device. By daisy-chaining the client devices via the reset line and sequentially assigning the unique client device addresses based on the determined time sequence, it is possible to assign the unique client device addresses from a single host interface port, thus reducing design complexity, footprint, and power consumption in the electronic device.

Before discussing exemplary aspects of time-sequenced multi-device address assignment that include specific aspects of the present disclosure, a brief overview of a conventional method for multi-device address assignment is first provided in FIG. 1. The discussion of specific exemplary aspects of time-sequenced multi-device address assignment starts with reference to FIG. 2.

In this regard, FIG. 1 is a conventional electronic device 100 including a conventional host controller 102 configured to assign unique client device addresses to a plurality of client devices 104(1)-104(N) from a plurality of host interface ports 106(1)-106(M). In a non-limiting example, the host interface ports 106(1)-106(M) include a plurality of clock pins 108(1)-108(M), a plurality of data pins 110(1)-110(M), a plurality of first reset pins 112(1)-112(M), and a plurality of second reset pins 114(1)-114(M), respectively. Each of the first reset pins 112(1)-112(M) is configured to support a respective first pre-assigned unique client device address. Likewise, each of the second reset pins 114(1)-114(M) is configured to support a respective second pre-assigned unique client device address. In this regard, each of the host interface ports 106(1)-106(M) can support two (2) uniquely addressed client devices. As a result, the conventional host controller 102 needs to employ a total of M (M=⌈N/2⌉) host interface ports 106(1)-106(M) to support the client devices 104(1)-104(N).

The conventional host controller 102 needs to place the client devices 104(1)-104(N) in reset mode during power cycling and/or before assigning unique device addresses to the client devices 104(1)-104(N). As such, the conventional host controller 102 is configured to reset the client devices 104(1)-104(N) via a plurality of reset lines 116(1)-116(N) (also referenced as RESET in FIG. 1), respectively. The reset lines 116(1)-116(N) are supported by the first reset pins 112(1)-112(M) and the second reset pins 114(1)-114(M) in the host interface ports 106(1)-106(M). For example, the reset line 116(1) and the reset line 116(2) are respectively supported by the first reset pin 112(1) and the second reset pin 114(1) in the host interface port 106(1), the reset line 116(3) and the reset line 116(4) are respectively supported by the first reset pin 112(2) and the second reset pin 114(2) in the host interface port 106(2), and the reset line 116(N−1) and the reset line 116(N) are respectively supported by the first reset pin 112(M) and the second reset pin 114(M) in the host interface port 106(M).

With continuing reference to FIG. 1, the host interface ports 106(1)-106(M) provide a plurality of clock lines 118(1)-118(M) (also referenced as CLK in FIG. 1). The clock lines 118(1)-118(M) are configured to provide reference clock signals (not shown) to the client devices 104(1)-104(N). The clock lines 118(1)-118(M) are enabled by the clock pins 108(1)-108(M) in the host interface ports 106(1)-106(M), respectively. Since each of the host interface ports 106(1)-106(M) is configured to support two (2) uniquely addressed client devices, each of the clock lines 118(1)-118(M) is also configured to support the two (2) uniquely addressed client devices. For example, the clock line 118(1) supports the client devices 104(1), 104(2), the clock line 118(2) supports the client devices 104(3), 104(4), and the clock line 118(M) supports the client devices 104(N−1), 104(N).

The host interface ports 106(1)-106(M) provide a plurality of data lines 120(1)-120(M) (also referenced as DATA in FIG. 1). The data lines 120(1)-120(M) are configured to enable data communication between the conventional host controller 102 and the client devices 104(1)-104(N). The data lines 120(1)-120(M) are enabled by the data pins 110(1)-110(M) in the host interface ports 106(1)-106(M), respectively. Since each of the host interface ports 106(1)-106(M) is configured to support two (2) uniquely addressed client devices, each of the data lines 120(1)-120(M) is also configured to support the two (2) uniquely addressed client devices. For example, the data line 120(1) supports the client devices 104(1), 104(2), the data line 120(2) supports the client devices 104(3), 104(4), and the data line 120(M) supports the client devices 104(N−1), 104(N).

According to above discussions, the conventional host controller 102 needs to employ the host interface ports 106(1)-106(M) (M>1) if the conventional electronic device 100 includes more than two (2) uniquely addressed client devices. In some non-limiting configurations, it is possible to share a single data line (e.g., the data line 120(1)) and a single clock line (e.g., the clock line 118(1)) among the client devices 104(1)-104(N). However, the conventional host controller 102 still needs to employ the host interface ports 106(1)-106(M) (M>1) if the conventional electronic device 100 includes more than two (2) uniquely addressed client devices. The increased number of host interface ports can lead to increased design complexity, footprint, and power consumption in the conventional electronic device 100. As such, it is desirable to reduce the number of host interface ports and the physical pins required for assigning unique client device addresses to multiple client devices, thus reducing design complexity, footprint, and power consumption in the conventional electronic device 100.

Figure 2:
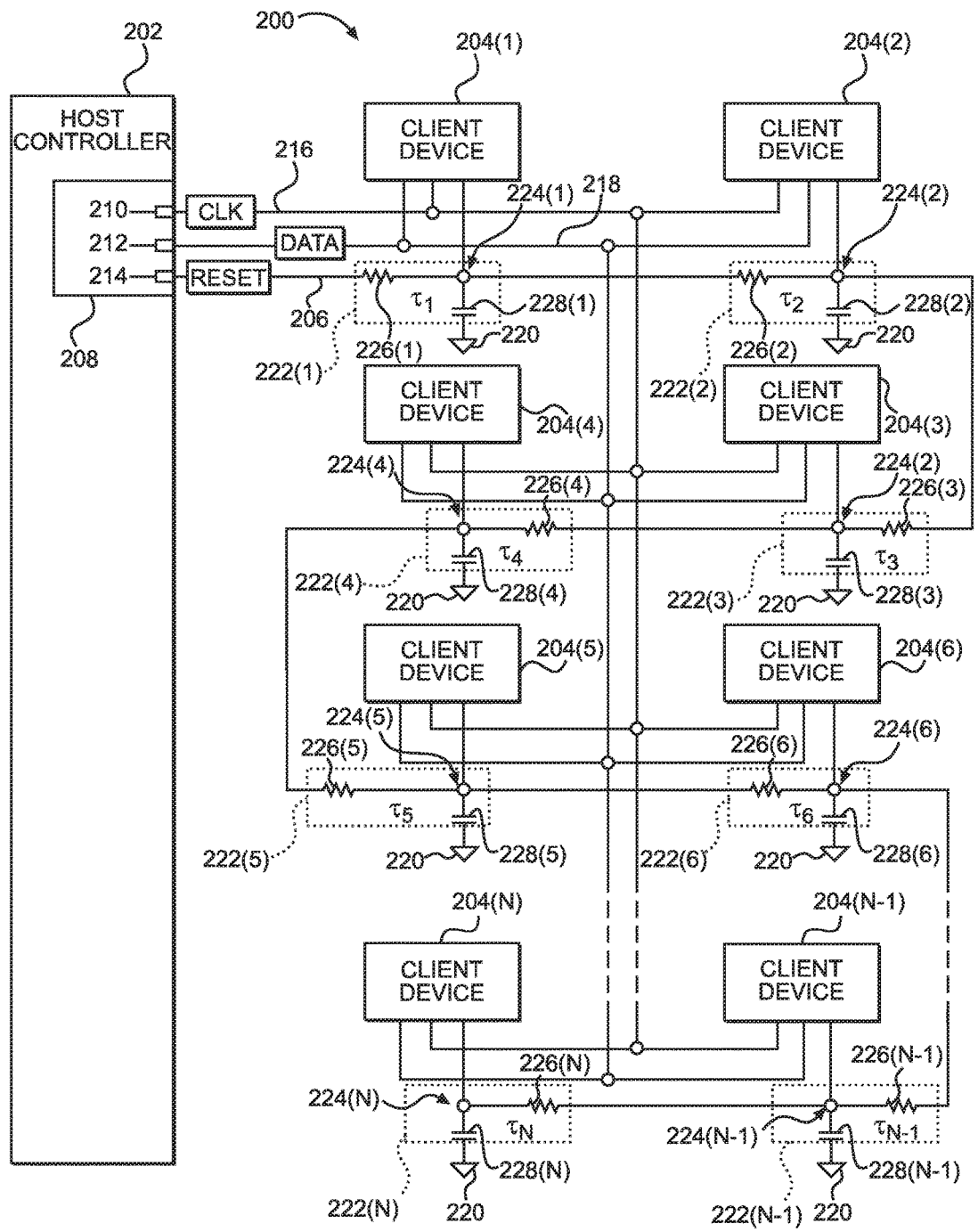
FIG. 2 is a schematic diagram of an exemplary electronic device including a host controller configured to assign sequentially a plurality of unique client device addresses to a plurality of client devices (daisy-chained client devices) via a reset line that daisy-chains the client devices to a host interface port in the host controller.

In this regard, FIG. 2 is a schematic diagram of an exemplary electronic device 200 including a host controller 202 configured to assign sequentially a plurality of unique client device addresses to a plurality of client devices 204(1)-204(N) via a reset line 206 that daisy-chains the client devices 204(1)-204(N) to a host interface port 208 in the host controller 202. It should be appreciated that it is also possible for the host controller 202 to assign sequentially the unique client device addresses to the client devices 204(1)-204(N) via any other configuration that provides a unique link between the client devices 204(1)-204(N) and respective address assignment time windows. According to specific exemplary aspects discussed below, the host controller 202 is configured to assert the reset line 206 to reset concurrently the client devices 204(1)-204(N). The host controller 202 is configured to assign unique client device addresses to each of the client devices 204(1)-204(N) by sequentially de-asserting the reset line 206 for the client devices 204(1)-204(N). By daisy-chaining the client devices 204(1)-204(N) via the reset line 206, it is possible to support the client devices 204(1)-204(N) without requiring additional reset line host interface ports, thus reducing design complexity, footprint, and power consumption in the electronic device 200. In a non-limiting example, the host controller 202 is also referenced to as a means for controlling a host, and the reset line 206 is also referenced to as a means for resetting client devices 204(1)-204(N).

Since the client devices 204(1)-204(N) are daisy-chained via the reset line 206, the client devices 204(1)-204(N) are hereinafter referred to as the daisy-chained client devices 204(1)-204(N). Accordingly, the daisy-chained client devices 204(1)-204(N) are disposed in a serial arrangement. In this regard, the daisy-chained client device 204(1), which is disposed closest to the host interface port 208, is also referred to as a first daisy-chained client device 204(1) among the daisy-chained client devices 204(1)-204(N). Likewise, the daisy-chained client device 204(N), which is disposed farthest from the host interface port 208, is also referred to as a last daisy-chained client device 204(N) among the daisy-chained client devices 204(1)-204(N).

The host interface port 208 includes a clock pin 210, a data pin 212, and a reset pin 214. The clock pin 210 is configured to support a clock line 216 (also referenced as CLK in FIG. 2), and the data pin 212 is configured to support a data line 218 (also referenced as DATA in FIG. 2). The reset pin 214 is configured to support the reset line 206 (also referenced as RESET in FIG. 2) that daisy-chains the client devices 204(1)-204(N). In this regard, the host interface port 208 requires only the reset pin 214, as opposed to the host interface ports 106(1)-106(M) in FIG. 1 that require the first reset pins 112(1)-112(M) and the second reset pins 114(1)-114(M), respectively. It shall be appreciated that it is not necessary for the client devices 204(1)-204(N) to be daisy-chained to the clock line 216 and/or the data line 218.

The host controller 202 places the daisy-chained client devices 204(1)-204(N) in reset mode before assigning unique client device addresses to the daisy-chained client devices 204(1)-204(N). As such, the host controller 202 is configured to reset substantially concurrently all of the daisy-chained client devices 204(1)-204(N) by asserting the reset line 206. In a non-limiting example, the host controller 202 asserts the reset line 206 by coupling the reset line 206 to a ground voltage 220 (e.g., zero volts (0 V)).

After asserting the reset line 206 for the daisy-chained client devices 204(1)-204(N), the host controller 202 is configured to de-assert the reset line 206 for the daisy-chained client devices 204(1)-204(N) sequentially from the first daisy-chained client device 204(1) to the last daisy-chained client device 204(N). In a non-limiting example, the host controller 202 can de-assert the reset line 206 by coupling the reset line 206 to a voltage that is higher than the ground voltage 220. In a non-limiting example, each of the daisy-chained client devices 204(1)-204(N) has respective internal reset line (not shown) or separately enabled power grid (not shown). As a result, the host controller 202 can independently de-assert the reset line 206 for each the daisy-chained client devices 204(1)-204(N) without adversely impacting the rest of the daisy-chained client devices 204(1)-204(N).

Figure 3:
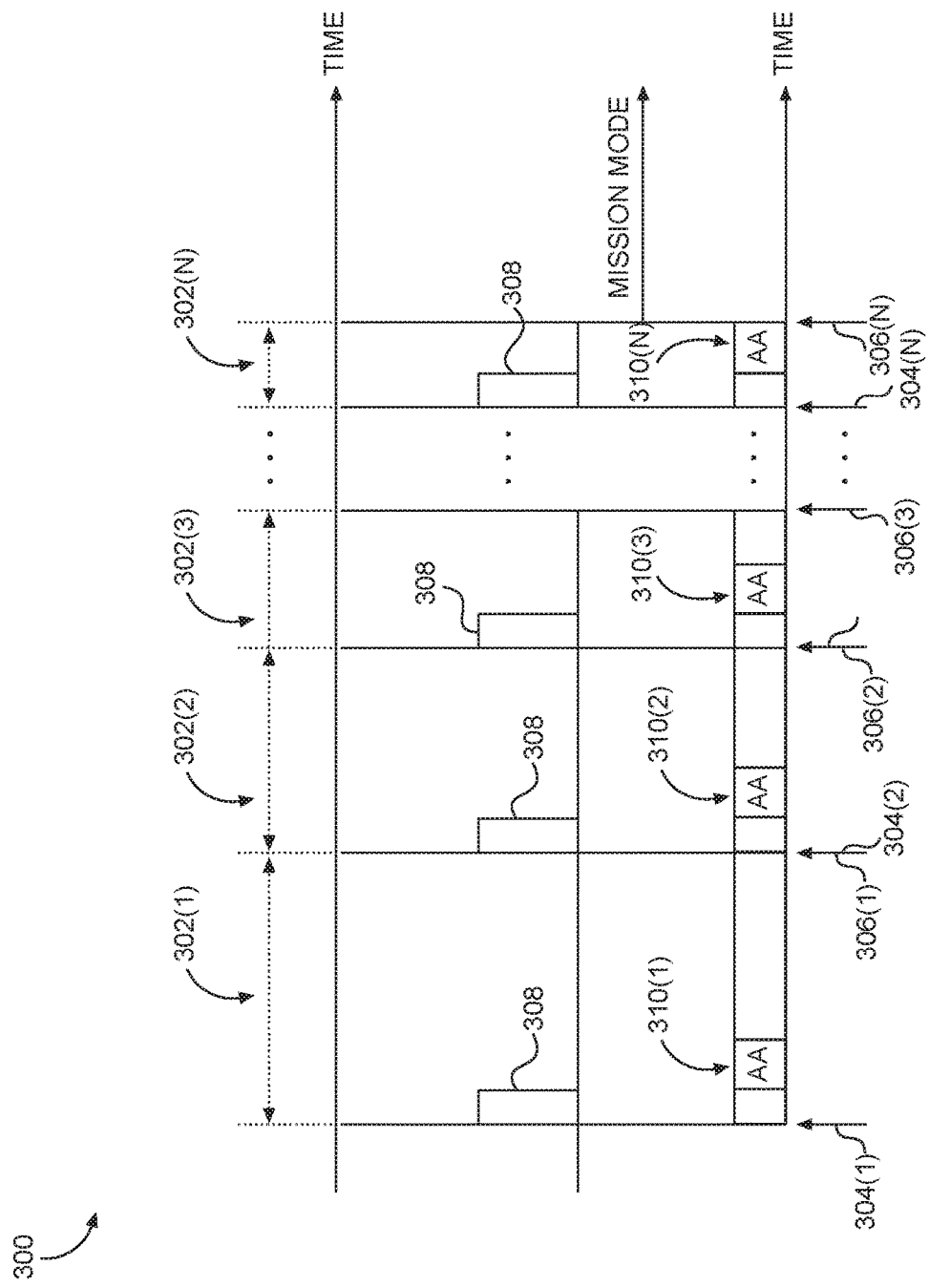
FIG. 3 is a schematic diagram of an exemplary determined time sequence that can be employed by the host controller of FIG. 2 to de-assert sequentially the reset line for the daisy-chained client devices.

The host controller 202 is configured to de-assert the reset line 206 for the daisy-chained client devices 204(1)-204(N) sequentially according to a determined time sequence, thus enabling time-sequenced multi-device address assignment. In an exemplary aspect, the sequential de-assertion is a function of delay associated with the reset line 206. In this regard, FIG. 3 is a schematic diagram of an exemplary determined time sequence 300 that can be employed by the host controller 202 of FIG. 2 to de-assert sequentially the reset line 206 for the daisy-chained client devices 204(1)-204(N). Common elements between FIGS. 2 and 3 are shown therein with common element numbers and will not be re-described herein.

With reference to FIG. 3, the determined time sequence 300 includes a plurality of address assignment time windows 302(1)-302(N), in which the host controller 202 can assign the unique client device addresses to the daisy-chained client devices 204(1)-204(N), respectively. The address assignment time windows 302(1)-302(N) start at a plurality of starting points 304(1)-304(N) and end at a plurality of ending points 306(1)-306(N), respectively. In a first non-limiting example, the address assignment time windows 302(1)-302(N) are of equal durations. In a second non-limiting example, the address assignment time windows 302(1)-302(N) are of different durations.

The host controller 202 de-asserts the reset line 206 for the daisy-chained client devices 204(1)-204(N) at the starting points 304(1)-304(N), respectively. In response to respective de-assertion of the reset line 206, each of the daisy-chained client devices 204(1)-204(N) is configured to generate a peripheral readiness pulse 308 to indicate readiness for a unique client device address assignment. In response to receiving the peripheral readiness pulses 308 in the address assignment time windows 302(1)-302(N), the host controller 202 assigns the unique client device addresses to the daisy-chained client devices 204(1)-204(N) in address assignment periods 310(1)-310(N) (also referenced as AA in FIG. 3), respectively.

The host controller 202 is required to complete assignment of the unique client device addresses to the daisy-chained client devices 204(1)-204(N) between the starting points 304(1)-304(N) and the ending points 306(1)-306(N) of the address assignment time windows 302(1)-302(N), respectively. For example, the host controller 202 must assign the unique client device address to the daisy-chained client device 204(1) between the starting point 304(1) and the ending point 306(1) of the address assignment time window 302(1), the host controller 202 must assign the unique client device address to the daisy-chained client device 204(2) between the starting point 304(2) and the ending point 306(2) of the address assignment time window 302(2), and so on. In a non-limiting example, the host controller 202 can be configured to assign the unique client device addresses to each of the daisy-chained client devices 204(1)-204(N) within time available to a shortest address assignment time window (e.g., the address assignment time window 302(N)) among the address assignment time windows 302(1)-302(N).

Given that the host controller 202 is only communicating with one of the daisy-chained client devices 204(1)-204(N) in any of the address assignment time windows 302(1)-302(N), the daisy-chained client devices 204(1)-204(N) may be assigned a common initial address prior to being assigned with respective unique client device addresses. Accordingly, the host controller 202 communicates with the daisy-chained client devices 204(1)-204(N) in the address assignment time windows 302(1)-302(N) using the common initial address.

With continuing reference to FIG. 3, the daisy-chained client devices 204(1)-204(N) are inactive before being assigned the unique client addresses and become active after receiving the unique client device addresses. For example, at the starting point 304(1), all of the daisy-chained client devices 204(1)-204(N) are inactive. Prior to the ending point 306(1) of the address assignment time window 302(1), the host controller 202 assigns the respective unique client device address to the daisy-chained client device 204(1). As such, the daisy-chained client device 204(1) becomes active while the daisy-chained client devices 204(2)-204(N) remain inactive. Continuing with the above example, after the starting point 304(2) but prior to the ending point 306(2), the host controller 202 assigns the respective unique client device address to the daisy-chained client device 204(2). As such, the daisy-chained client devices 204(1), 204(2) are active while the remaining daisy-chained client devices 204(3)-204(N) are inactive. Finally after the starting point 304(N) but prior to the ending point 306(N), the host controller 202 assigns the respective unique client device address to the daisy-chained client device 204(N). As such, all of the daisy-chained client devices 204(1)-204(N) become active and the electronic device 200 is placed in a mission mode for normal operation.

With reference back to FIG. 2, in a non-limiting example, the electronic device 200 includes a plurality of resistor-capacitor (RC) circuits 222(1)-222(N) disposed on the reset line 206 in a serial arrangement to force an appropriate amount of delay in the de-assertion of the reset line 206. In this regard, the RC circuits 222(1)-222(N) are daisy-chained on the reset line 206. The daisy-chained client devices 204(1)-204(N) are coupled to the RC circuits 222(1)-222(N) via a plurality of coupling points 224(1)-224(N), respectively.

The RC circuits 222(1)-222(N) include a plurality of resistors 226(1)-226(N) and a plurality of capacitors 228(1)-228(N), respectively. The RC circuits 222(1)-222(N) include a plurality of RC time constants $\tau_1$-$\tau_N$, respectively. The RC time constants $\tau_1$-$\tau_N$ are temporal delays required to charge fully the capacitors 228(1)-228(N) in the RC circuits 222(1)-222(N). As discussed next in FIG. 4, the RC time constants $\tau_1$-$\tau_N$ of the RC circuits 222(1)-222(N) define the starting points 304(1)-304(N) in the address assignment time windows 302(1)-302(N) of FIG. 3.

Figure 4:
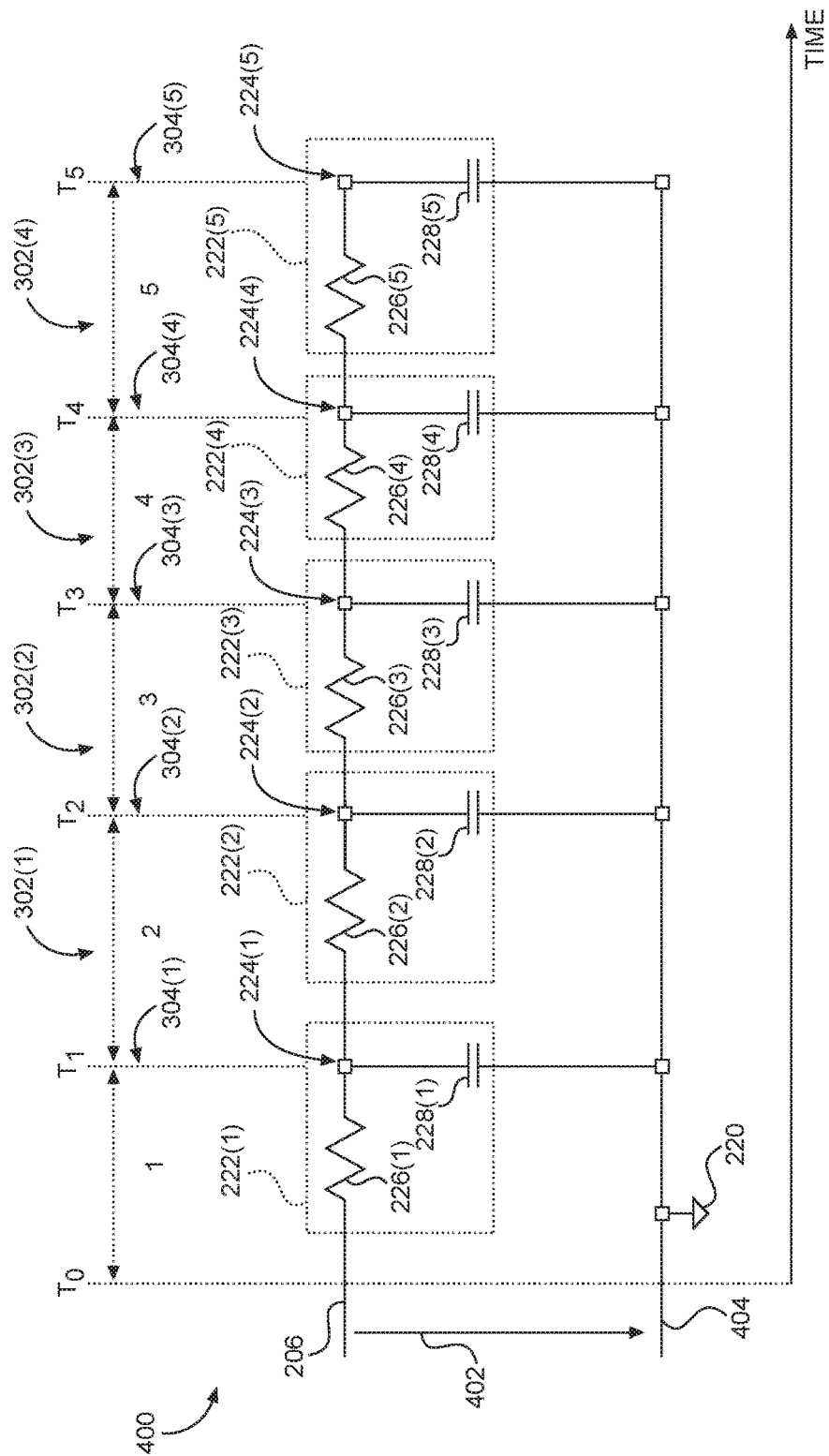
FIG. 4 is a schematic diagram of an exemplary daisy-chained RC circuit that can be provided in the electronic device of FIG. 2 to support time-sequenced multi-device address assignment.

In this regard, FIG. 4 is a schematic diagram of an exemplary illustration of daisy-chained RC circuit 400 that can be provided in the electronic device 200 of FIG. 2 to support time-sequenced multi-device address assignment. Common elements between FIGS. 2-4 are shown therein with common element numbers and will not be re-described herein.

For the convenience of illustration, the daisy-chained RC circuit 400 is discussed herein with reference to the RC circuits 222(1)-222(5). It shall be appreciated that configurations and operation principles discussed herein with references to the RC circuits 222(1)-222(5) are applicable to the RC circuits 222(6)-222(N) as well.

As previously discussed in FIG. 2, before assigning the unique client devices to the daisy-chained client devices 204(1)-204(N), the host controller 202 resets the daisy-chained client devices 204(1)-204(N) by coupling the reset line 206 to the ground voltage 220. Accordingly, the coupling points 224(1)-224(5) are pulled down to the ground voltage 220 when the host controller 202 asserts the reset line 206. Further according to previous discussions in FIG. 2, the host controller 202 then de-asserts the reset line 206 sequentially for the daisy-chained client devices 204(1)-204(N) by coupling the reset line 206 to a voltage higher than the ground voltage 220. In this regard, the host controller 202 applies a de-assertion voltage 402 between the reset line 206 and a ground 404.

When the de-assertion voltage 402 is applied between the reset line 206 and the ground 404 at time $T_0$, the capacitor 228(1) in the RC circuit 222(1) will not be charged instantaneously due to the RC time constant $\tau_1$ associated with the RC circuit 222(1). At time $T_1$ ($T_1=T_0+\tau_1$), the capacitor 228(1) is fully charged and the coupling point 224(1) is pulled up to the de-assertion voltage 402. As such, the reset line 206 for the daisy-chained client device 204(1), which is coupled to the coupling point 224(1), is de-asserted. Accordingly, the starting point 304(1) of the address assignment time window 302(1) begins at time $T_1$.

As such, at time $T_1$, the coupling point 224(1) is pulled up to the de-assertion voltage 402, and thus, propagates the de-assertion voltage 402 to the RC circuit 222(2). Like the capacitor 228(1) in the RC circuit 222(1), the capacitor 228(2) in the RC circuit 222(2) will not be charged instantaneously due to the RC time constant $\tau_2$ associated with the RC circuit 222(2). As a result, the coupling point 224(2)

remains at the ground voltage 220. At time $T_2$ ($T_2=T_1+\tau_2$), the capacitor 228(2) is fully charged and the coupling point 224(2) is pulled up to the de-assertion voltage 402. As such, the reset line 206 for the daisy-chained client device 204(2), which is coupled to the coupling point 224(2), is de-asserted. Accordingly, the starting point 304(2) of the address assignment time window 302(2) begins at time $T_2$.

At time $T_2$, the coupling point 224(2) is pulled up to the de-assertion voltage 402, and thus, propagates the de-assertion voltage 402 to the RC circuit 222(3). At time $T_3$ ($T_3=T_2+\tau_3$), the capacitor 228(3) is fully charged and the coupling point 224(3) is pulled up to the de-assertion voltage 402. As such, the reset line 206 for the daisy-chained client device 204(3), which is coupled to the coupling point 224(3), is de-asserted. Accordingly, the starting point 304(3) of the address assignment time window 302(3) begins at time $T_3$.

At time $T_3$, the coupling point 224(3) is pulled up to the de-assertion voltage 402, and thus, propagates the de-assertion voltage 402 to the RC circuit 222(4). At time $T_4$ ($T_4=T_3+\tau_4$), the capacitor 228(4) is fully charged and the coupling point 224(4) is pulled up to the de-assertion voltage 402. As such, the reset line 206 for the daisy-chained client device 204(4), which is coupled to the coupling point 224(4), is de-asserted. Accordingly, the starting point 304(4) of the address assignment time window 302(4) begins at time $\tau_4$.

At time $T_4$, the coupling point 224(4) is pulled up to the de-assertion voltage 402, and thus, propagates the de-assertion voltage 402 to the RC circuit 222(5). At time $T_5$ ($T_5=T_4+\tau_5$), the capacitor 228(5) is fully charged and the coupling point 224(5) is pulled up to the de-assertion voltage 402. As such, the reset line 206 for the daisy-chained client device 204(5), which is coupled to the coupling point 224(5), is de-asserted. Accordingly, the starting point 304(5) begins at time $T_5$. The propagation of the de-assertion voltage 402 during at the times $T_1$-$T_5$ is summarized in the table below.

|  | Coupling Point | $T_0$ | $T_1$ | $T_2$ | $T_3$ | $T_4$ | $T_5$ |
|---|---|---|---|---|---|---|---|
| De-assertion | 224(1) | Low | High | High | High | High | High |
| Voltage | 224(2) | Low | Low | High | High | High | High |
| (402) | 224(3) | Low | Low | Low | High | High | High |
|  | 224(4) | Low | Low | Low | Low | High | High |
|  | 224(5) | Low | Low | Low | Low | Low | High |

As discussed above, the daisy-chained RC circuit 400 is able to propagate the de-assertion voltage 402 sequentially from the RC circuit 222(1) to the RC circuit 222(5). The RC time constants $\tau_1$-$\tau_5$ of the RC circuits 222(1)-222(5) inherently associate the starting points 304(1)-304(5) to time-sequence $T_1$-$T_5$. Hence, the host controller 202 is able to support time-sequenced multi-device address assignment based on the daisy-chained RC circuit 400. In a non-limiting example, it is possible to define an address assignment delay budget for the host controller 202 based on a cumulative RC time constant ($\tau_1$-$\tau_2$+$\tau_3$+$\tau_4$+$\tau_5$) of the RC circuits 222(1)-222(5).

In a non-limiting example, the resistors 226(1)-226(5) are each configured to have six hundred eighty kiloohms (680 KΩ) resistance and the capacitors 228(1)-228(5) are each configured to have ten nanofarad (10 nF or 0.01 μF) capacitance. As such, the starting points 304(1)-304(5) are not uniformly distributed. However, it shall be appreciated that it is possible to make the starting points 304(1)-304(5) uniformly distributed by adjusting the resistances of the resistors 226(1)-226(5) and/or the capacitances of the capacitors 228(1)-228(5).

With reference back to FIG. 2, in a first non-limiting example, the host interface port 208 is an inter-integrated circuit (I2C) host interface port, and the daisy-chained client devices 204(1)-204(N) are a plurality of I2C peripheral devices. In a second non-limiting example, the host interface port 208 is a radio frequency front-end (RFFE) host interface port, and the daisy-chained client devices 204(1)-204(N) are a plurality of RFFE peripheral devices.

The host controller 202 can perform time-sequenced multi-device address assignment according to a process. In this regard, FIG. 5 is a flowchart of a process 500 the host controller 202 of FIG. 2 can employ to support time-sequenced multi-device address assignment.

Figure 5:
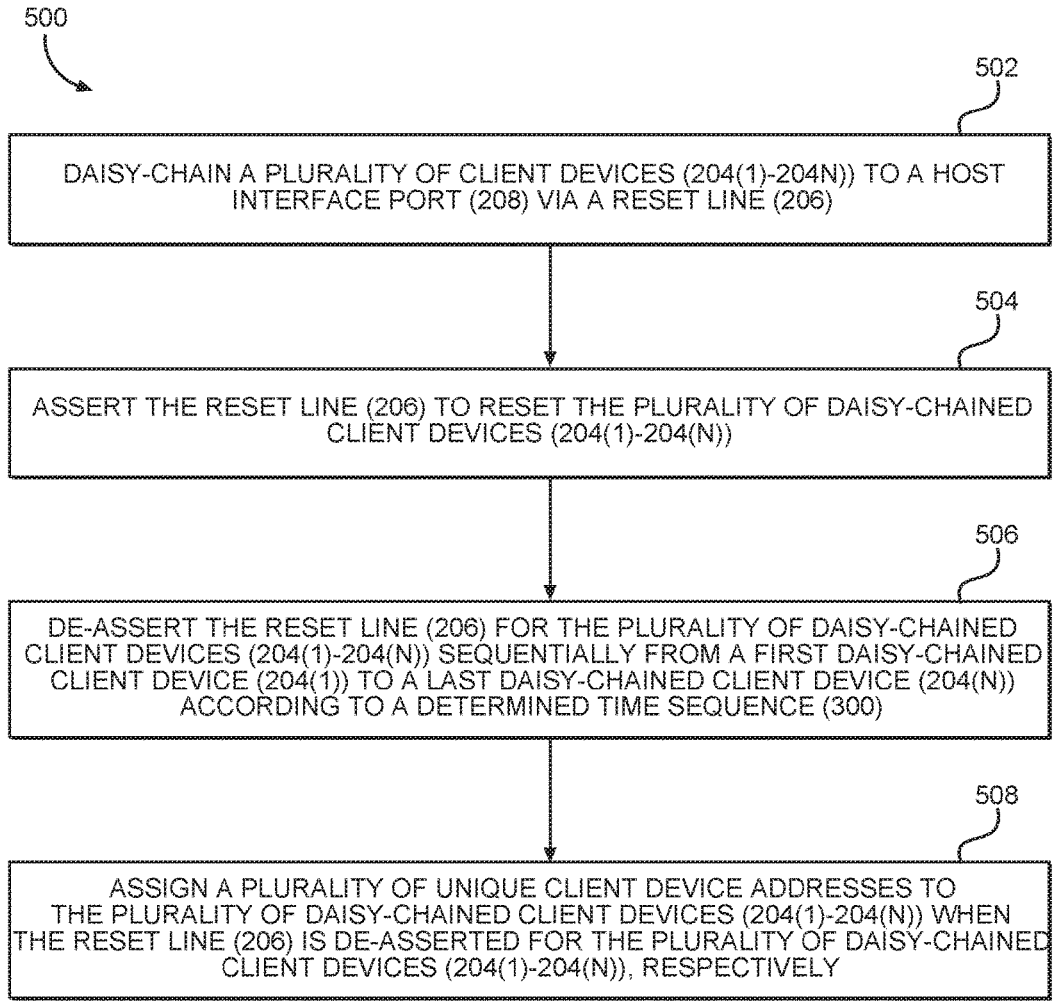
FIG. 5 is a flowchart of a process the host controller of FIG. 2 can employ to support time-sequenced multi-device address assignment.

With reference to FIG. 5, the client devices 204(1)-204(N) are daisy-chained to the host interface port 208 via the reset line 206 (block 502). The host controller 202 first asserts the reset line 206 to reset the daisy-chained client devices 204(1)-204(N) (block 504). The host controller 202 then de-asserts the reset line 206 for the daisy-chained client devices 204(1)-204(N) sequentially from the first daisy-chained client device 204(1) to the last daisy-chained client device 204(N) according to the determined time sequence 300 (block 506). The host controller 202 assigns the unique client device addresses to the daisy-chained client devices 204(1)-204(N) when the reset line 206 is de-asserted for the daisy-chained client devices 204(1)-204(N), respectively (block 508).

The host controller 202 of FIG. 2 can be further configured to assign the unique client device addresses to the daisy-chained client devices 204(1)-204(N) according to a control process. In this regard, FIG. 6 is a flowchart of an exemplary control process 600 that may be employed by the host controller 202 of FIG. 2 for assigning the unique client device addresses to the daisy-chained client devices 204(1)-204(N).

Figure 6:
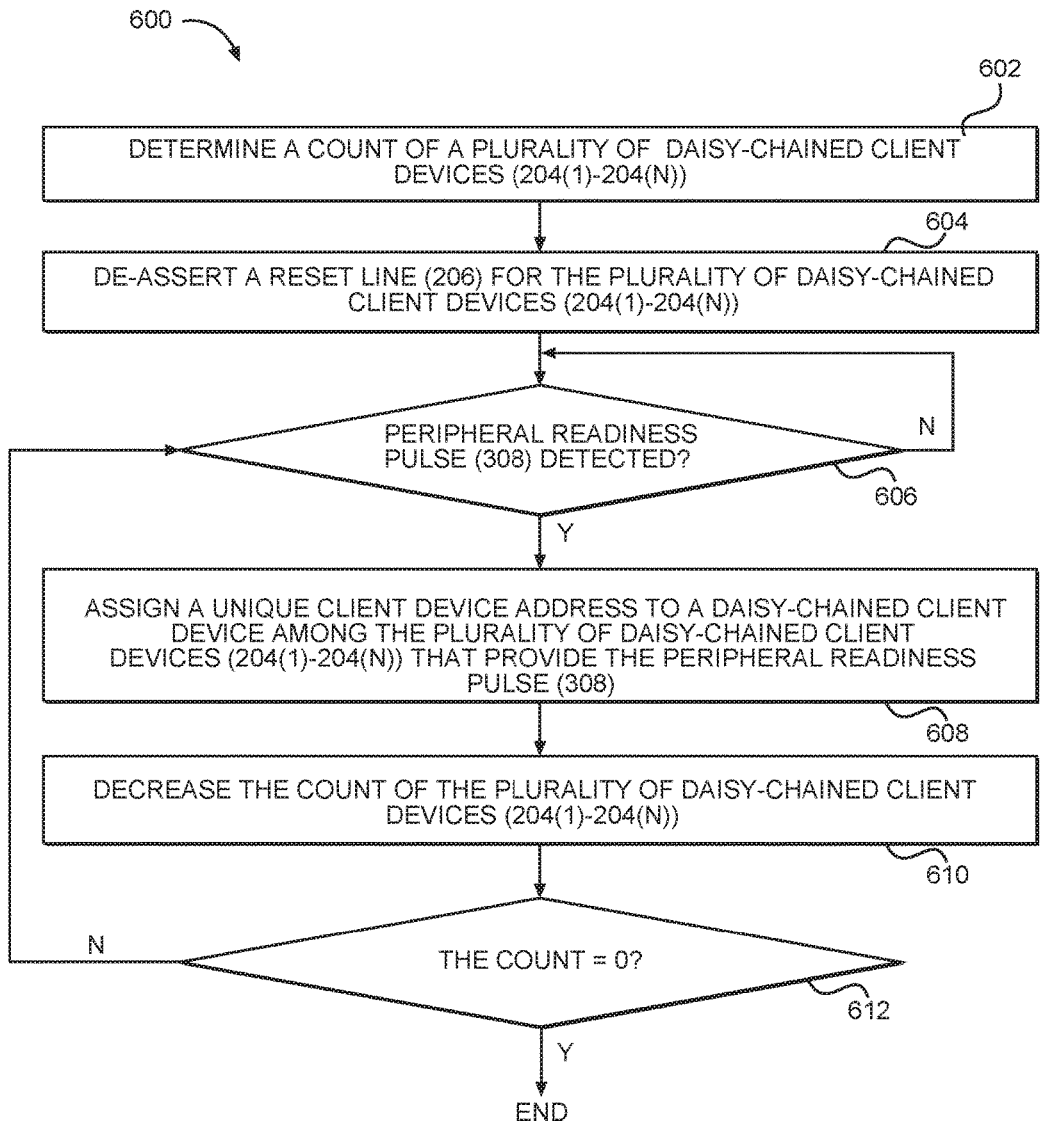
FIG. 6 is a flowchart of an exemplary control process that may be employed by the host controller of FIG. 2 for assigning the unique client device addresses to the daisy-chained client devices.

With reference to FIG. 6, the host controller 202 first determines a count of the daisy-chained client devices 204(1)-204(N) (block 602). The host controller 202 may store the count in a client device counter (not shown). The host controller 202 de-asserts the reset line 206 for the daisy-chained client devices 204(1)-204(N) (block 604). The host controller 202 awaits the peripheral readiness pulse 308 to be received (block 606). Upon receiving the peripheral readiness pulse 308, the host controller 202 assigns a unique client device address to a daisy-chained client device among the daisy-chained client devices 204(1)-204(N) that provides the peripheral readiness pulse 308 (block 608). The host controller 202 then decreases the count of the daisy-chained client devices 204(1)-204(N) (block 610). In this regard, the host controller 202 may decrease the client device counter by one (1). The host controller 202 checks whether the count of the daisy-chained client devices 204(1)-204(N) equals zero (block 612). In a non-limiting example, the host controller 202 checks whether the client device counter equals 0. If the count of the daisy-chained client devices 204(1)-204(N) is greater than 0, the host controller 202 awaits another peripheral readiness pulse 308. Otherwise, the host controller 202 ends the control process 600.

Time-sequenced multi-device address assignment according to aspects disclosed herein may be provided in or integrated into any processor-based device, such as the electronic device 200 of FIG. 2. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 7:
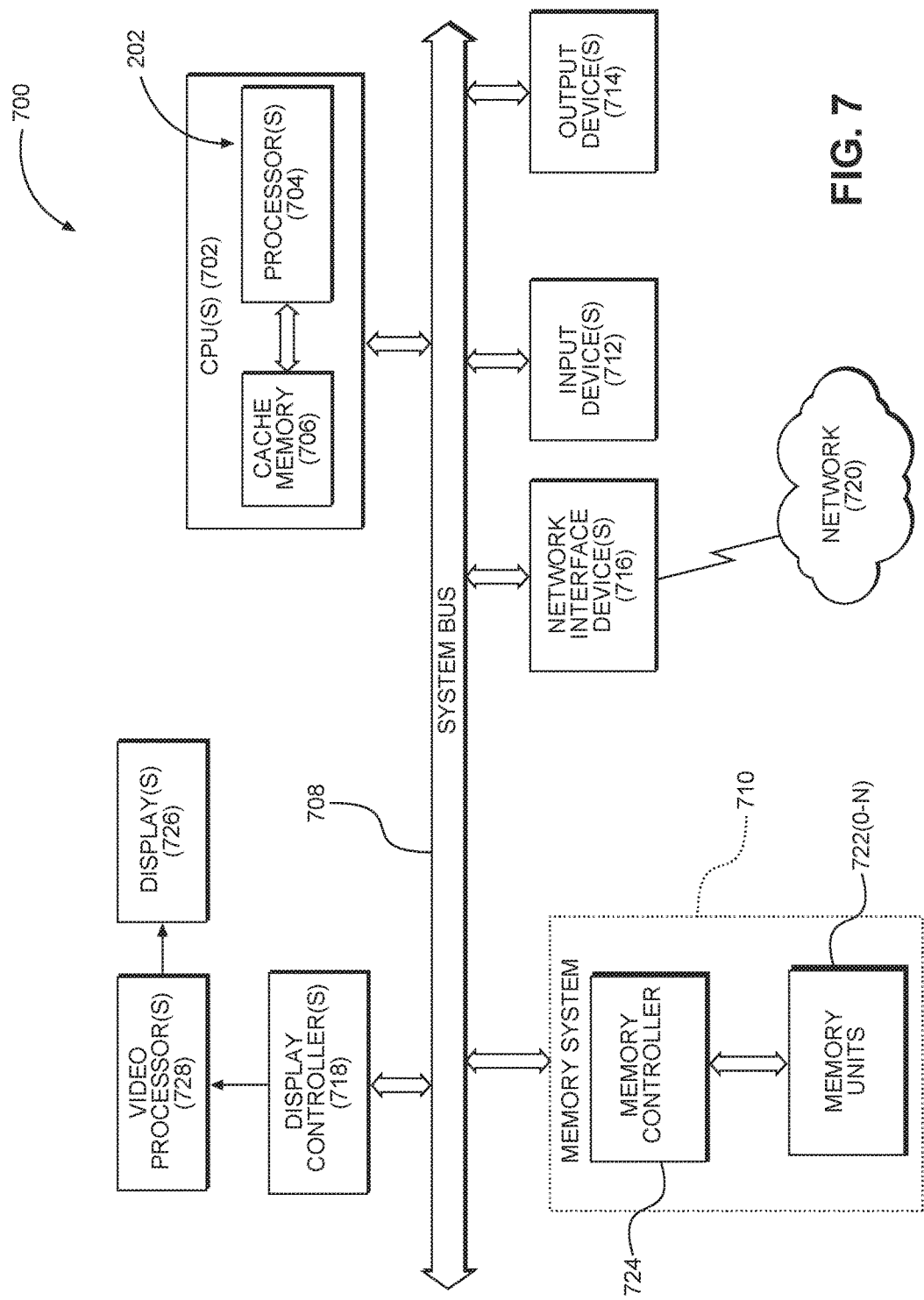
FIG. 7 illustrates an example of a processor-based system that can support the host controller of FIG. 2.

In this regard, FIG. 7 illustrates an example of a processor-based system 700 that can support the host controller 202 of FIG. 2. In this example, the processor-based system 700 includes one or more central processing units (CPUs) 702, each including one or more processors 704. In this regard, the CPU(s) 702 can be configured to function as the host controller 202 of FIG. 2. The CPU(s) 702 may have cache memory 706 coupled to the processor(s) 704 for rapid access to temporarily stored data. The CPU(s) 702 is coupled to a system bus 708. As is well known, the CPU(s) 702 communicates with other devices by exchanging address, control, and data information over the system bus 708. Although not illustrated in FIG. 7, multiple system buses 708 could be provided, wherein each system bus 708 constitutes a different fabric.

Other master and slave devices can be connected to the system bus 708. As illustrated in FIG. 7, these devices can include a memory system 710, one or more input devices 712, one or more output devices 714, one or more network interface devices 716, and one or more display controllers 718, as examples. The input device(s) 712 can include any type of input device, including, but not limited to, input keys, switches, voice processors, etc. The output device(s) 714 can include any type of output device, including, but not limited to, audio, video, other visual indicators, etc. The network interface device(s) 716 can be any device configured to allow exchange of data to and from a network 720. The network 720 can be any type of network, including, but not limited to, a wired or wireless network, a private or public network, a local area network (LAN), a wireless local area network (WLAN), a wide area network (WAN), a BLUETOOTH™ network, or the Internet. The network interface device(s) 716 can be configured to support any type of communications protocol desired. The memory system 710 can include one or more memory units 722(0-N) and a memory controller 724.

The CPU(s) 702 may also be configured to access the display controller(s) 718 over the system bus 708 to control information sent to one or more displays 726. The display controller(s) 718 sends information to the display(s) 726 to be displayed via one or more video processors 728, which process the information to be displayed into a format suitable for the display(s) 726. The display(s) 726 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To illustrate clearly this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure.

Thus, the disclosure is not intended to be limited to the examples and designs described herein, but is to be accorded the widest scope consistent with the principles and novel features disclosed herein.

What is claimed is:

1. An electronic device, comprising:
a host controller comprising a host interface port;
a plurality of client devices communicatively coupled to the host interface port via a shared bus; and
a reset line configured to daisy-chain the plurality of client devices to the host interface port, wherein:
a first daisy-chained client device among the plurality of daisy-chained client devices is disposed closest to the host interface port; and
a last daisy-chained client device among the plurality of daisy-chained client devices is disposed farthest from the host interface port;
wherein the host controller is configured to:
assert the reset line to reset the plurality of daisy-chained client devices;
de-assert the reset line for the plurality of daisy-chained client devices sequentially at a plurality of starting points, respectively from the first daisy-chained client device to the last daisy-chained client device according to a determined time sequence, the determined time sequence comprising a plurality of address assignment time windows that starts at the plurality of starting points and ends at a plurality of ending points, respectively; and
assign a plurality of unique client device addresses to the plurality of daisy-chained client devices between the plurality of starting points and the plurality of ending points, respectively when the reset line is de-asserted for the plurality of daisy-chained client devices, respectively.

2. The electronic device of claim 1, wherein the host controller is further configured to:
assert the reset line to reset the plurality of daisy-chained client devices by coupling the reset line to a ground voltage; and
de-assert the reset line for the plurality of daisy-chained client devices by sequentially coupling the plurality of daisy-chained client devices to a voltage higher than the ground voltage according to the determined time sequence.

3. The electronic device of claim 1, wherein the host controller is further configured to assign each of the plurality of unique client device addresses according to a shortest address assignment time window among the plurality of address assignment time windows.

4. The electronic device of claim 1, wherein:
the reset line comprises a plurality of resistor-capacitor (RC) circuits disposed in a serial arrangement; and
the plurality of daisy-chained client devices are coupled to the reset line via the plurality of RC circuits, respectively.

5. The electronic device of claim 4, wherein the plurality of RC circuits comprises a plurality of RC time constants that define the plurality of address assignment time windows, respectively.

6. The electronic device of claim 5, wherein the plurality of RC time constants defines the plurality of starting points in the plurality of address assignment time windows, respectively.

7. The electronic device of claim 5, wherein a cumulative RC time constant of the plurality of RC circuits defines an address assignment delay budget in the host controller.

8. The electronic device of claim 1, wherein the host controller is further configured to support the reset line via a reset pin in the host interface port.

9. The electronic device of claim 1, wherein the host controller is further configured to assign the plurality of unique client device addresses using a common initial address.

10. The electronic device of claim 1, wherein:
the host interface port is comprised of an inter-integrated circuit (I2C) host interface port; and
the plurality of client devices is comprised of a plurality of I2C peripheral devices.

11. The electronic device of claim 1, wherein:
the host interface port is comprised of a radio frequency front-end (RFFE) host interface port; and
the plurality of client devices is comprised of a plurality of RFFE peripheral devices.

12. An electronic device, comprising:
a means for controlling a host comprising a host interface port;
a plurality of client devices communicatively coupled to the host interface port via a shared bus; and
a means for resetting client devices configured to daisy-chain the plurality of client devices to the host interface port, wherein:
a first daisy-chained client device among the plurality of daisy-chained client devices is disposed closest to the host interface port; and
a last daisy-chained client device among the plurality of daisy-chained client devices is disposed farthest from the host interface port;
wherein the means for controlling the host is configured to:
assert the means for resetting client devices to reset the plurality of daisy-chained client devices;
de-assert the means for resetting client devices for the plurality of daisy-chained client devices sequentially at a plurality of starting points, respectively from the first daisy-chained client device to the last daisy-chained client device according to a determined time sequence, the determined time sequence comprising a plurality of address assignment time windows that starts at the plurality of starting points and ends at a plurality of ending points, respectively; and
assign a plurality of unique client device addresses to the plurality of daisy-chained client devices between the plurality of starting points and the plurality of ending points, respectively when the means for resetting client devices is de-asserted for the plurality of daisy-chained client devices, respectively.

13. A method for assigning a plurality of unique client device addresses to a plurality of client devices, comprising:
daisy-chaining the plurality of client devices to a host interface port via a reset line;
asserting the reset line to reset the plurality of daisy-chained client devices;
de-asserting the reset line for the plurality of daisy-chained client devices sequentially from a first daisy-chained client device to a last daisy-chained client device according to a determined time sequence;
defining a plurality of address assignment time windows for the determined time sequence, wherein the plurality of address assignment time windows starts at a plurality of starting points and ends at a plurality of ending points, respectively;

assigning the plurality of unique client device addresses to the plurality of daisy-chained client devices when the reset line is de-asserted for the plurality of daisy-chained client devices, respectively;

disposing a plurality of resistor-capacitor (RC) circuits in the reset line in a serial arrangement; and coupling the plurality of daisy-chained client devices to the reset line via the plurality of RC circuits, respectively.

14. The method of claim 13, further comprising:

asserting the reset line to reset the plurality of daisy-chained client devices by coupling the reset line to a ground voltage; and de-asserting the reset line for the plurality of daisy-chained client devices by sequentially coupling the plurality of daisy-chained client devices to a voltage higher than the ground voltage according to the determined time sequence.

15. The method of claim 13, further comprising:

de-asserting the reset line for the plurality of daisy-chained client devices sequentially at the plurality of starting points, respectively; and assigning the plurality of unique client device addresses to the plurality of daisy-chained client devices between the plurality of starting points and the plurality of ending points, respectively.

16. The method of claim 15, further comprising assigning each of the plurality of unique client device addresses according to a shortest address assignment time window among the plurality of address assignment time windows.

* * * * *